W. F. DAY.
VALVE FOR GAS BURNERS.
APPLICATION FILED JUNE 5, 1916.

1,254,211. Patented Jan. 22, 1918.

WITNESSES
M. R. McInnis
E. A. Paul

INVENTOR
WILBUR F. DAY
BY Paul H. [illegible]
ATTORNEYS

UNITED STATES PATENT OFFICE.

WILBUR F. DAY, OF ST. PAUL, MINNESOTA.

VALVE FOR GAS-BURNERS.

1,254,211.  Specification of Letters Patent.  Patented Jan. 22, 1918.

Application filed June 5, 1916. Serial No. 101,770.

*To all whom it may concern:*

Be it known that I, WILBUR F. DAY, citizen of the United States, resident of St. Paul, county of Ramsey, State of Minnesota, have invented certain new and useful Improvements in Valves for Gas-Burners, of which the following is a specification.

In the operation of a burner using kerosene and the like for fuel, considerable difficulty has been experienced in controlling the feed of the fuel to the burner and properly regulating the supply where several burners are mounted on one base and connected with the same source of fuel.

The object of my invention, therefore, is to provide a valve having a single connection with a source of supply and an independent connection with each burner so that one burner may be used or any number of them.

A further object is to provide a valve equipped with means for preventing the backward flow of the fuel therein or a flareback of the flame from the burner.

Other objects of the invention will appear from the following detailed description.

The invention consists generally in various constructions and combinations, all as hereinafter described and particularly pointed out in the claims.

In the accompanying drawings forming part of this specification,

Figure 1:
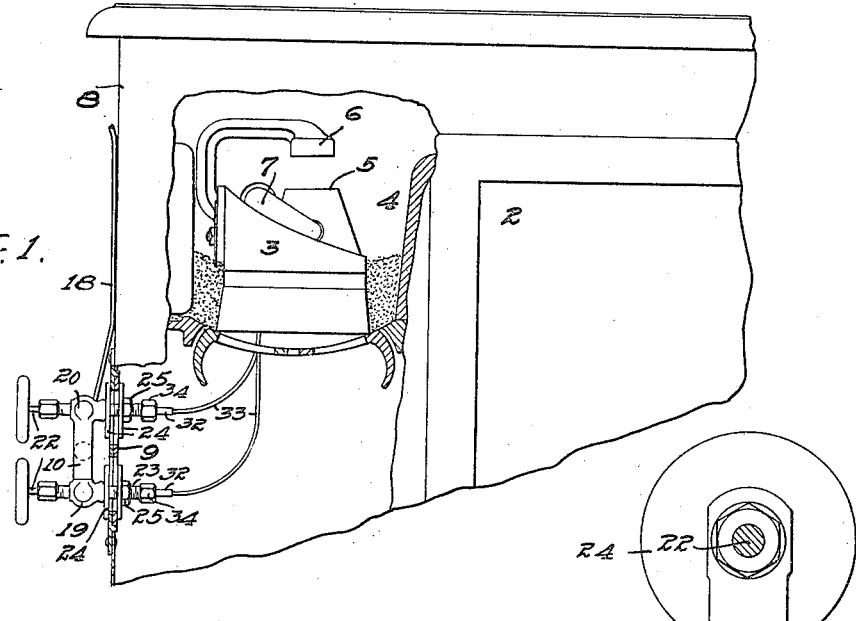
Figure 1 is a sectional view through a stove illustrating the application of my invention thereto.
Figure 2:
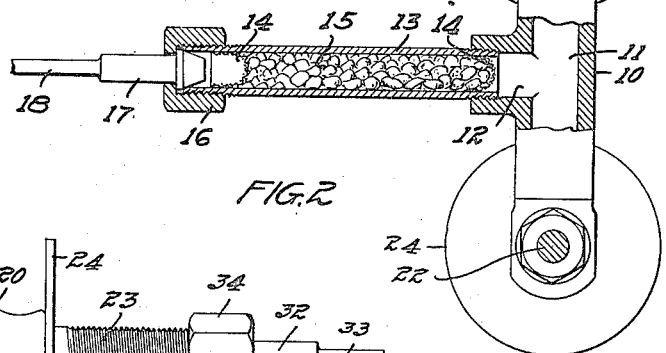
Fig. 2 is a detail sectional view, taken on the line $x$—$x$ of Fig. 3, showing the connection between the supply and the valve.
Figure 3:
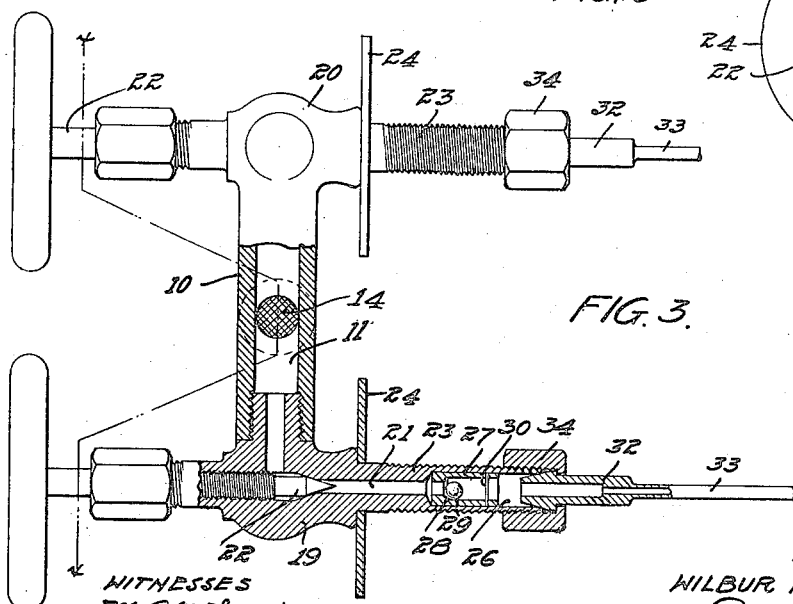
Fig. 3 is a detail sectional view showing the connection between the valve and the burner.

In the drawing, 2 represents a stove and 3 a burner mounted in the firebox 4 and having the usual mixing chamber 5 and a deflector 6 above said chamber. 7 is a gas generating pipe leading into the mixing chamber. These parts all form the subject matter of Letters Patent of the United States No. 1,163,221 issued to me on the 7th day of December, 1915, and I make no claim to the same herein.

8 represents the front of the stove, having the usual draft slide 9. 10 is a casing, having a passage 11 therethrough communicating through a port 12 with a pipe 13 in which screens 14 are arranged, with a suitable filtering material 15 interposed between them. One end of the pipe 13 is provided with a collar 16 which engages the cone-shaped head of a coupling 17 from which the fuel is delivered to the pipe 13 through a flexible tube 18. This tube can be bent to any desired angle for connection with the fuel supply.

Mounted on the casing 10 are valve casings 19 and 20 having ducts 21 communicating with the passage 11 and each of these valve casings is provided with a needle valve 22 for closing the ducts and checking the flow of the fuel therethrough. Each valve casing is provided with a nipple 23 which projects through the slots in the damper slide and is locked therein by means of washers 24 and lock nuts 25.

The nipples 23 have chambers 26 formed therein in which tubular carriers 27 are arranged and provided with valve seats 28 for a ball valve 29 which is loosely mounted in the carrier and held therein by a pin 30.

The ball 29 has freedom of movement between its seat 28 and the pin 30 to allow the fuel to flow through the nipple to the coupling 32 and the tube 33 but will prevent backward flow of the fuel and also prevent any backward flash in case the fuel should become ignited between the valve and the burner. Each of the valves 19 and 20 is equipped with this check valve and has the coupling 32 and the tube 33, the end of the coupling being tapered and seated against the end of the nipple and held by the collar 34. In this case two valves are shown, with independent connections to the burners and evidently by means of the needle valves the flow to the burners may be separately regulated.

I claim as my invention:

1. The combination, with a stove and a liquid fuel burner mounted in the fire box thereof, of a casing having a fuel supply passage running lengthwise thereof, valve casings having ducts communicating with the ends of said passage and needle valves for said ducts, said casings having nipples formed thereon for passing through openings in the wall of the stove, said nipples having chambers formed therein and ball valve carriers loosely mounted in said chambers and having passages therethrough, balls mounted loosely within said carriers and having a limited movement therein for closing said passages against backward flow of the fuel back of the burner flame, tubes connected with the burners respectively and couplings for connecting said tubes with said nipples.

2. A valve for controlling the flow of liquid fuel to a burner comprising a casing having a fuel supply duct therein and a needle valve for said duct, a flexible tube leading from said duct to the burner, a cage mounted in said duct between said needle valve and said tube and having a port therethrough, and a valve loosely mounted in said cage for closing said port.

In witness whereof, I have hereunto set my hand this 20th day of May, 1916.

WILBUR F. DAY.